United States Patent [19]

Okabe et al.

[11] Patent Number: 4,790,796
[45] Date of Patent: Dec. 13, 1988

[54] FREE PISTON TYPE AUTO-TENSIONER

[75] Inventors: Yoshio Okabe, Chiryu; Yukimori Kobayashi, Gamagohri; Eiji Shirai, Okazaki, all of Japan

[73] Assignee: Aisin Seiki Kabushiki Kaisha, Kariya, Japan

[21] Appl. No.: 117,537

[22] Filed: Nov. 6, 1987

[30] Foreign Application Priority Data

Nov. 6, 1986 [JP] Japan .................. 61-262650

[51] Int. Cl.⁴ .............................................. F16H 7/12
[52] U.S. Cl. ...................................... 474/110; 474/138
[58] Field of Search ............... 474/101, 109, 110, 111, 474/133, 135, 136, 138; 267/124, 129

[56] References Cited

U.S. PATENT DOCUMENTS 4,539,001 9/1985 Okabe .................................. 474/138
4,657,524 4/1987 Okabe .................................. 474/110

Primary Examiner—Thuy M. Bui
Attorney, Agent, or Firm—Oblon, Fisher, Spivak, McClelland & Maier

[57] ABSTRACT

A free piston type auto-tensioner adjusts a tension of an engine timing belt for automobiles. The auto-tensioner includes a body, a plunger slidably disposed in the body to form a first oil chamber, a free piston slidably disposed in the body to form a second oil chamber, a first seal member disposed between the body and the piston, a second seal member disposed between the piston and a rod of the plunger, an oil passage formed in the plunger to establish an oil communication between the first and second oil chambers, a check valve disposed in the oil passage, a first spring biasing the plunger, and a second spring biasing the piston.

7 Claims, 4 Drawing Sheets

FREE PISTON TYPE AUTO-TENSIONER

BACKGROUND OF THE INVENTION

1. Field of the Invention:

This invention relates to a free piston type auto-tensioner for adjusting the tension of an engine timing belt in apparatus such as an automobile.

2. Description of the Related Art:

Various types of auto-tensioners for preventing the slackening of an engine timing belt for automobiles have been proposed. One example of a prior art auto-tensioner is disclosed in the Japanese patent application laid-open publication No. 59(1984)-126144 as shown herein at FIG. 4. In FIG. 4, an auto-tensioner comprises a body 1 in which a plunger 2 is slidably disposed so as to form a large diameter oil chamber 4 having a seal member 3. The plunger is continuously biased in the direction of the oil chamber 4 by a spring 7 interposed between a snap ring 5 and a stepped portion 6 of the plunger 2.

The plunger 2 is provided with a bore 8 in which a piston 9 is slidably disposed so as to form a small diameter oil chamber 11 communicating with the large diameter oil chamber 4 through a small diameter passage 10. The small diameter oil chamber 11 is sealed from the outside by means of a seal member 12. Secured to an open portion of the bore 8 is a snap ring 13 which may come into contact with a stepped portion 14 of the piston 9 in order to prevent the piston 9 from coming out. A head portion 9a of the piston 9 protrudes outwardly from the body 1. An end surface 9b functions as a pushing surface of the auto-tensioner.

FIG. 3 generally shows an auto-tensioner c installed on a bracket b, and which pushes a belt a via an idler pulley d to tension the belt. When an engine temperature rises from a normal temperature to a high temperature, thermal expansion causes an increase in the distance between a cam and a crank whereby the tension of the belt a shown in FIG. 3 is increased. At this time, since the load applied to the piston 9 of the auto-tensioner c is increased, the oil pressure within the small diameter oil chamber 11 is also increased. Therefore, the oil flows from the small diameter oil chamber 11 into the large diameter oil chamber 4 through the small diameter passage 10 with the result that the piston 9 is moved downward within the body 1 and that the increase in the belt tension is absorbed.

On the other hand, when the engine temperature falls from the high temperature to the normal temperature, the tension of the belt a is decreased whereby the load applied to the piston 9 is decreased. Therefore, due to the oil pressure within the small diameter oil chamber 11, the piston 9 protrudes from the body 1 and pushes the belt, whereby the decreased belt tension can be absorbed. Thus, an appropriate tension of the belt can be maintained.

In the above prior art auto-tensioner, however, when the piston 9 is pushed down due to increased belt tension, a high oil pressure is generated in the small diameter oil chamber 11. Since the high oil pressure acts on the seal member 12 through a gap between the piston 9 and the plunger 2, the seal member 12 is indesirably deformed.

Furthermore, the high oil pressure in the small diameter oil chamber 11 acts on the large diameter oil chamber 4 through the small diameter passage 10. Since the large diameter oil chamber 4 receives the biasing force of the spring 7, the high oil pressure in the large diameter oil chamber 4 has a bad influence on the seal member 3 via the gap between the plunger 2 and the body 1. Therefore, the sealing function of the seal members 3 and 12 is deteriorated and the oil eventually leaks past the seal members 3 and 12.

SUMMARY OF THE INVENTION

Accordingly, it is an object of the present invention to eliminate the drawbacks of the prior art auto-tensioner.

Another object of the present invention is to provide a new and improved free piston type auto- tensioner.

Still another object of the present invention is to provide a free piston type auto-tensioner in which the sealing function of a seal member is not deteriorated.

In one illustrative embodiment of the present invention, there is provided a free piston type auto-tensioner which includes a body, a plunger slidably disposed in the body so as to form a first oil chamber in cooperation with the body, a free piston slidably disposed in the body so as to form a second oil chamber in cooperation with the body and plunger, a first seal member disposed between the body and the piston, a second seal member disposed between the free piston and a rod portion of the plunger, an oil passage formed in the plunger for establishing oil communication between the first and second oil chambers, a check valve disposed in the oil passage, a first spring biasing the plunger in the direction of the second oil chamber, and a second spring biasing the free piston in the direction of the second oil chamber.

BRIEF DESCRIPTION OF THE DRAWINGS

Further objects and advantages of the present invention will become apparent from the following description of the preferred embodiment taken in conjunction with the accompanying drawings.

DETAILED DESCRIPTION OF THE PREFERRED EMBODIMENTS

Figure 1:
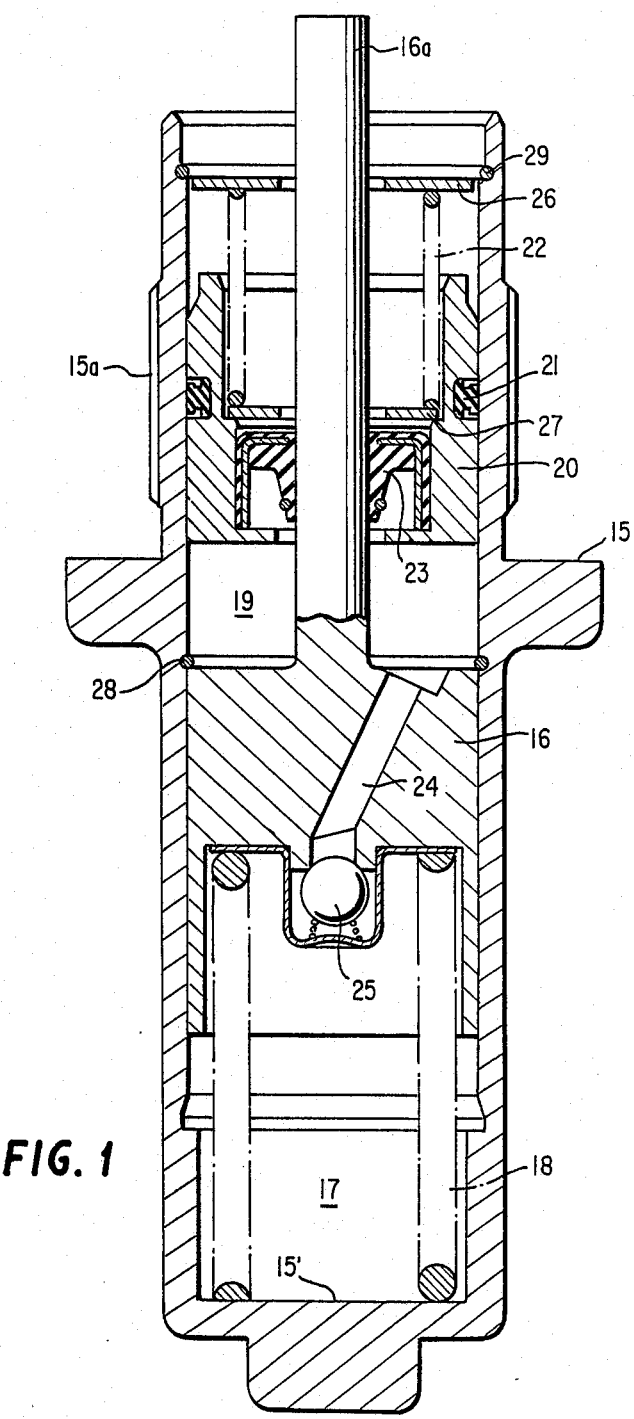
FIG. 1 is a vertical sectional view of a free piston type auto-tensioner constructed in accordance with one illustrative embodiment of the invention.

Referring now to FIG. 1, a free piston type auto-tensioner includes a cylindrical body 15 which has a bottom wall 15' and is provided on the outer circumference thereof with a screw thread 15a for securement relative to an engine. Slidably disposed in the body 15 is a plunger 16 which is provided with a small diameter rod 16a protruding from the body 15 so as to come into contact with a belt to be tensioned (not shown).

A first oil chamber 17 is formed between the bottom wall 15' of the body 15 and the plunger 16. The plunger is continuously biased in the direction of the belt by biasing means in the form of a spring 18 interposed in the first oil chamber 17.

A free piston 20 is slidably disposed in the body 15 through a first seal member 21. A second oil chamber 19 is formed by the free piston 20, the plunger 16, and the body 15. The free piston is biased in the direction of the second oil chamber 19 by biasing means in the form of a second spring 22 interposed between spring retainers 26 and 27. A second seal member 23 is interposed between the free-piston and the rod 16a so as to prevent the oil from coming out of the second oil chamber 19.

The plunger 16 is provided with an oil passage 24 which comprises means to establish oil communication between the first and second oil chambers. Disposed in the oil passage 24 is a check valve 25 which comprises means for permitting oil flow only from the second oil chamber 19 to the first oil chamber 17. The retainer 26 is supported by a snap ring 29. An upward movement of the plunger 16 is limited by a snap ring 28 functioning as a stopper means.

Since no seal is provided between the plunger 16 and the body 15, and since a gap must exit between the two to permit relative sliding, the gap forms a restricted oil communication passage so that oil can leak at a controlled rate from the first oil chamber 17 to the second oil chamber 19, while permitting downward movement of the plunger 16, in response to a downward pressure by the belt on the plunger 16.

Figure 3:
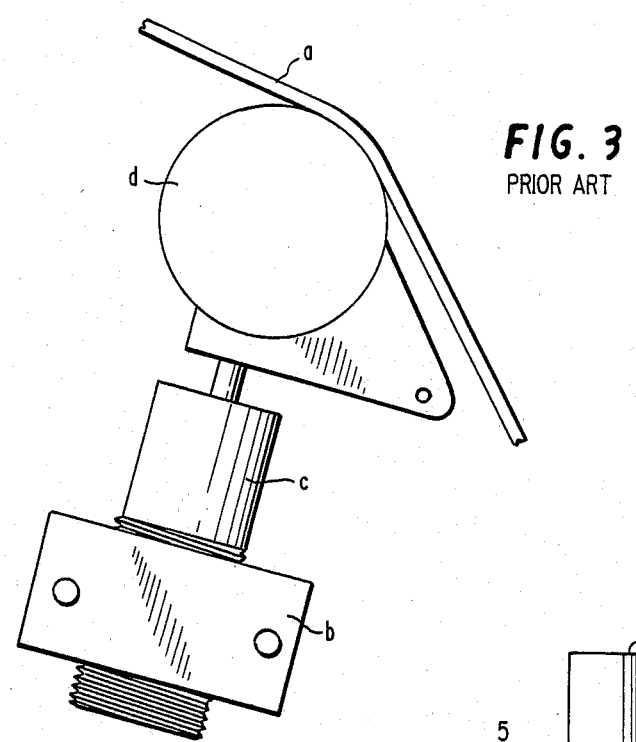
FIG. 3 is a front view generally showing an engagement condition between an auto-tensioner and a belt.
Figure 4:
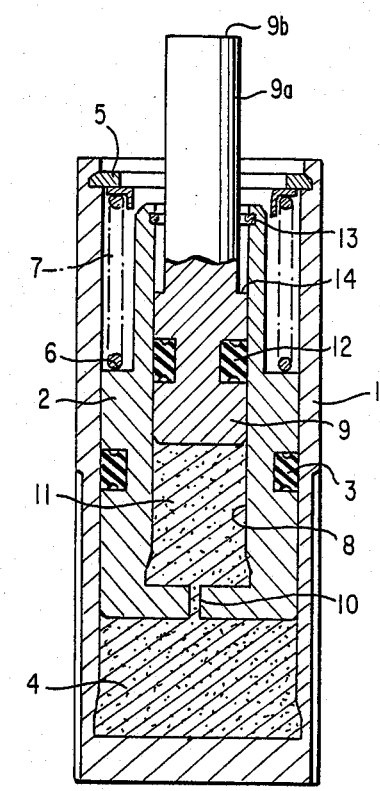
FIG. 4 is a vertical sectional view of a prior art auto-tensioner.

In operation, when an engine temperature rises from a normal temperature to a high temperature, a thermal expansion increases the distance between a cam and a crank, with the result that a tension of the belt a shown in FIG. 3 is increased. Therefore, the load applied to the plunger 16 through the rod 16a is increased, and the oil pressure in the first oil chamber 17 rises to a high level. As a result, the oil in the first oil chamber 17 flows from the first oil chamber 17 into the second oil chamber 19 through the unsealed gap between the body 15 and the plunger 16, whereby the plunger 16 is moved downwardly. Thus, the tension belt in a slackens, and the increase of the belt tension is absorbed. At this time the free piston 20 is moved upwardly by the pressure of the oil entering into the second oil chamber 19. This continues until an equilibrium condition is achieved. At the equilibrium condition, the initially high pressure in the first oil chamber 17 will be reduced by the balancing force of the springs 18 and 22. Since the restriction imposed by the gap between the body 15 and the plunger 16 delays the flow of oil into the second oil chamber 19, it does not receive the initially high oil pressure.

On the other hand, when the engine temperature falls from the high temperature to the normal temperature, the tension of the belt is decreased. Therefore, the plunger 16 is pushed upwardly by the spring 18, thereby absorbing the decreased belt tension while initially reducing the oil pressure in the first oil chamber 17. At this time the oil flows from the second oil chamber 19 into the first oil chamber 17 through the oil passage 24 and the check valve 25. The free piston 20 is moved downwardly by the spring 22 in response to the decreased amount of the oil in the second oil chamber 19.

During these operations the oil pressure in the second oil chamber 19 acts on the seal member 21. However, since the oil pressure in the second oil chamber 19 is smaller than the initial oil pressure in the first oil chamber 17, the seal member 21 is not deteriorated by high oil pressure and the deformation of the seal member 21 is prevented.

Figure 2:
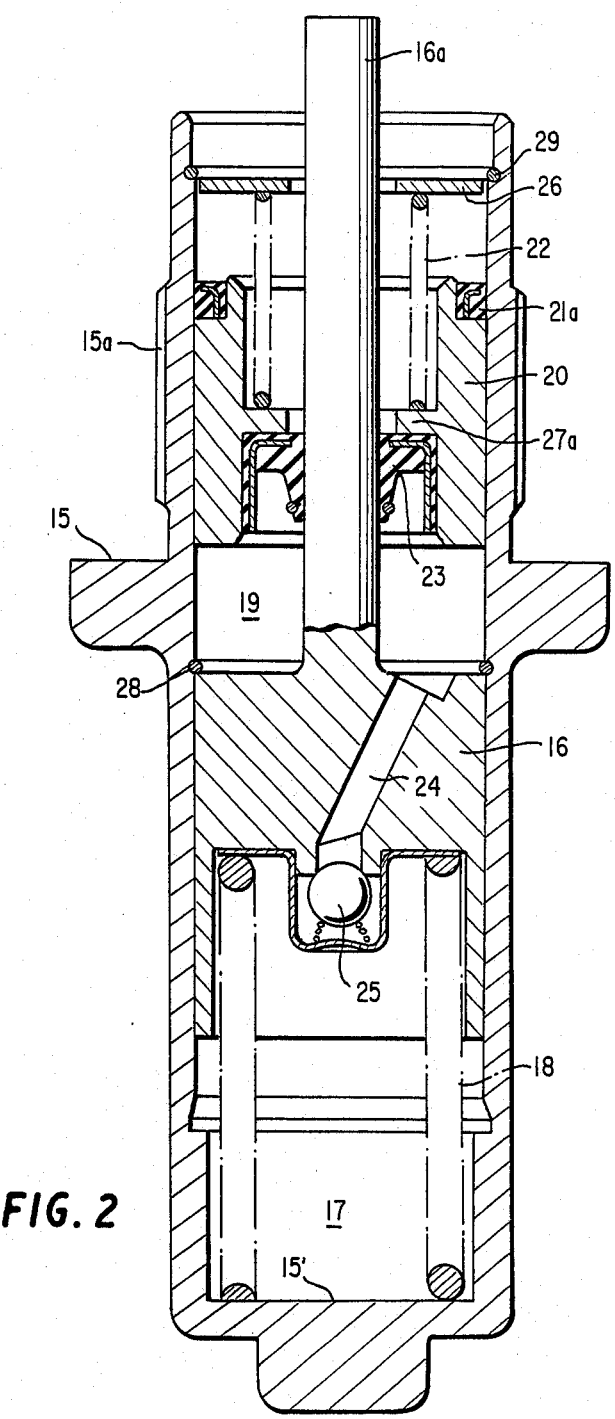
FIG. 2 is a vertical sectional view of a free piston type auto-tensioner constructed in accordance with another illustrative embodiment of the invention.

In FIG. 2 showing another embodiment, a seal member 21a is disposed in an upper end of the free piston 20. Instead of the retainer 27 shown in FIG. 1, the piston 20 is provided with a stepped portion 27a supporting the spring 22.

As seen from the above, according to the present invention there is no need to install a seal member between the body 15 and plunger 16. It is sufficient to install only a seal member between the body 15 and the piston 20 receiving the oil pressure in the second oil chamber 19. The load applied to the plunger 16 from the belt tension does not act directly on the second oil chamber 19. The second oil chamber 19 receives only the oil pressure flowing from the first oil chamber 17 through the gap between the plunger 16 and the body 15. Therefore, the fluctuation of the oil pressure in the second oil chamber 19 is smaller than that in the first oil chamber 17, whereby the oil pressure does not have a bad influence on the seal members 21, 21a.

The terms and expressions which have been employed are used as terms of description and not of limitation, and there is no intention, in the use of such terms and expressions, of excluding any equivalents of the features shown and described, or portion thereof, it being recognized that various modifications are possible within the scope of the invention claimed.

What is claimed as new and desired to be secured by Letters Patent of the United States is:

1. A free piston type auto-tensioner comprising:
   a body;
   a plunger having a rod and being slidably disposed in said body, said plunger cooperating with said body to form a first oil chamber in said body;
   a free piston slidably disposed in said body and cooperating with said body and said plunger to form a second oil chamber in said body;
   a first seal member disposed between said body and said piston;
   a second seal member disposed for sealing between said piston and said rod of said plunger;
   an oil passage formed in said plunger and comprising means for establishing oil communication between said first and second oil chambers;
   a check valve disposed in said oil passage and comprising means for permitting oil flow only in a direction from said second chamber to said first chamber;
   a first spring comprising means for biasing said plunger in the direction of said second oil chamber; and
   a second spring comprising means for biasing said piston in the direction of said second oil chamber.

2. A free piston type auto-tensioner according to claim 1, including stopper means secured to said body for preventing said plunger from moving in the direction of said rod.

3. A free piston type auto-tensioner according to claim 1, including a retainer disposed in said piston for supporting said second spring.

4. A free piston type auto-tensioner according to claim 1, including a stepped portion formed in said piston for supporting said second spring.

5. A free piston type auto-tensioner according to claim 1, wherein said first seal member is disposed in an upper end of said piston.

6. The free piston type auto-tensioner of claim 1, including an unsealed annular gap between said body and said plunger, thereby forming a restricted oil communication passage between said first and second oil chambers.

7. The free piston type auto-tensioner of claim 1 mounted in an automobile engine, including a belt engaged by an end of said plunger rod.

* * * * *

UNITED STATES PATENT AND TRADEMARK OFFICE
CERTIFICATE OF CORRECTION

PATENT NO. : 4,790,796

DATED : December 13, 1988

INVENTOR(S) : Okabe et al.

It is certified that error appears in the above-identified patent and that said Letters Patent is hereby corrected as shown below:

In column 3, line 18, delete "exit" and insert --exist--.

Signed and Sealed this

Thirtieth Day of May, 1989

Attest:

DONALD J. QUIGG

Attesting Officer

Commissioner of Patents and Trademarks